United States Patent
Kim et al.

(10) Patent No.: US 8,150,259 B2
(45) Date of Patent: Apr. 3, 2012

(54) PASSIVE OPTICAL NETWORK SYSTEM AND OPTICAL SIGNAL RECEIVING METHOD THEREOF

(75) Inventors: Bong-Kyu Kim, Daejeon (KR); Yool Kwon, Busan (KR); Bin-Yeong Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 844 days.

(21) Appl. No.: 12/240,121

(22) Filed: Sep. 29, 2008

(65) Prior Publication Data
US 2009/0317084 A1   Dec. 24, 2009

(30) Foreign Application Priority Data
Jun. 23, 2008   (KR) .......................... 10-2008-0059170

(51) Int. Cl.
*H04J 14/00*   (2006.01)
*H04J 4/00*   (2006.01)

(52) U.S. Cl. ................. 398/47; 398/46; 398/74; 398/75

(58) Field of Classification Search .................... 398/46, 398/47, 68, 74, 79
See application file for complete search history.

(56) References Cited

U.S. PATENT DOCUMENTS

| | | | |
|---|---|---|---|
| 2002/0145775 A1 | 10/2002 | Effenberger et al. | |
| 2005/0172328 A1 | 8/2005 | Park et al. | |
| 2007/0154217 A1* | 7/2007 | Kim et al. | 398/72 |

FOREIGN PATENT DOCUMENTS

| | | | |
|---|---|---|---|
| KR | 100584419 B1 | 5/2006 |
| KR | 100813900 B1 | 3/2008 |
| KR | 1020090059018 A | 6/2009 |

OTHER PUBLICATIONS

Ki-Man Choi et al., "An Efficient Evolution Method From TDM-PON to Next-Generation PON", IEEE Photonics Technology Letters, vol. 19, No. 9, May 1, 2007.

* cited by examiner

*Primary Examiner* — Armando Rodriguez

(57) ABSTRACT

A passive optical network system includes: a plurality of optical signal splitter receiving optical signals from a plurality of optical network units (ONUs) to provide a plurality of upstream optical signals having different wavelengths; a hybrid optical filter multiplexing the plurality of upstream optical signals in a wavelength division multiplexing (WDM) scheme; and an optical line terminal (OLT) receiving the multiplexed upstream optical signals in a time division multiplexing (TDM) scheme. Therefore, the network system can be easily expanded when the number of subscribers increases, and the optical loss can be minimized.

16 Claims, 7 Drawing Sheets

PASSIVE OPTICAL NETWORK SYSTEM AND OPTICAL SIGNAL RECEIVING METHOD THEREOF

CROSS-REFERENCE TO RELATED APPLICATIONS

This U.S. non-provisional patent application claims priority under 35 U.S.C. §119 of Korean Patent Application No. 10-2008-0059170, filed on Jun. 23, 2008, the entire contents of which are hereby incorporated by reference.

BACKGROUND OF THE INVENTION

The present invention disclosed herein relates to an optical communication system, and more particularly, to a passive optical network (PON) system and an optical signal receiving method thereof.

Recently, Internet traffic is rapidly increasing due to continuous growth of video-based application services, which require real-time data transmission, and provision of telecommunication/broadcasting convergence services. In order to efficiently cope with the increase of traffic, network operators have continuously increased transmission bandwidths by utilizing Wavelength Division Multiplexing (WDM) technology in inter-metropolitan backbone networks and metro networks.

On the other hand, subscriber networks which distribute traffics transmitted from the backbone network to final subscribers have been used in a state that a typical Very-high-bit-rate Digital Subscriber Line (VDSL) and cable modem based transmission technology and a high-speed Ethernet based technology are mixed. Fundamentally, these technologies have a short network installation area and their transmission bandwidths are extremely limited in stably providing integrated services which are under intensive investigation. To solve these limitations, optical network technologies, which are under intensive development, aim to efficiently provide transmission bandwidth necessary for the integrated services to the final subscribers.

Optical network technologies, which are under intensive investigation, may be classified into a Time Division Multiplexing Passive Optical Network (TDM-PON) technology and a Wavelength Division Multiplexing Passive Optical Network (WDM-PON) technology. In the case of the TDM-PON, an optical line terminal (OLT) and a plurality of optical network units (ONUs) are connected together through a passive optical splitter, and a single transmission wavelength is shared at an optical layer by the plurality of ONUs. In the TDM-PON, a downstream data transmission is achieved by a Time Domain Multiplexing (TDM) scheme, and an upstream data transmission is achieved by a Time Division Multiple Access (TDMA) scheme based on a bandwidth reservation.

On the other hand, the WDM-PON constructs a logical point-to-point configuration by allocating individual transmission wavelengths to ONUs. Since data transmission between the OLT and the ONUs is achieved independently without any time division procedure, high transmission bandwidths can be provided to the subscribers. However, in the case of the WDM-PON, subscriber charge per bandwidth is high due to the expensive transmission system, and thus it is expected that somewhat long time is necessary to reach the practical utilization step. On the contrary, the TDM-PON is considered as next-generation optical network technology because it can efficiently use the same wavelength through the time division and its system price is relatively low. The TDM-PON technology may be classified into Ethernet-PON, G-PON, and B-PON according to the frame format of a transport layer, but their basic concepts of the upstream/downstream transmission control are equal to one another. In the case of the upstream transmission, since the data transmission from a plurality of ONUs and optical network terminals (ONTs) to the OLT, which is the common destination, is achieved by the shared link, an appropriate media access control (MAC) technology is required for preventing data collision. To this end, generally, the ONU and the ONT reserve bandwidth necessary to the next transmission period, based on a total amount of data accumulated in a buffer. After arbitrating such a reservation, the OLT allocates transmission time slots, that is, upstream bandwidths. Therefore, it is possible to maintain high network efficiency and also fairly allocate bandwidths to the ONUs. In this case, since data frames transmitted from the respective ONUs during the time slot period are the point-to-point communication where the primary destination is the OLT, the fairness of the bandwidth allocation can be easily maintained through the control of the time slots.

On the contrary, the downstream data transmission is achieved as follows. That is, all the data frames transmitted from the OLT are split at the optical layer by an optical splitter and broadcast to all the ONUs and ONTs, and the individual ONUs filter only the necessary frames from the received frames at the MAC layer, based on the destination address. In this case, if all the traffics are unicast frames, that is, frames directed to only the single destination, just like the case of the upstream transmission, the OLT can ensure the fairness of the bandwidth allocation by fairly allocating the downstream transmission time slots to the ONUs. However, in the case of the downstream transmission in the TDM-PON, a large amount of multicast traffics always exist due to VoD and SVD services or the like. These multicast traffics are simultaneously shared by a plurality of ONUs through the optical splitting.

FIG. 1 is a block diagram illustrating the architecture of a TDM-PON system. Referring to FIG. 1, a plurality of ONUs 30 through 60 are connected to one OLT 10. The OLT 10 and the ONUs 30 through 60 are connected together through an optical signal splitter 20. Each of the ONUs 30 through 60 shares optical lines with the OLT 10 and thus shares the installation cost of the optical lines and the cost of the OLT 10. The sharing of the optical lines can reduce the service charges of the ONUs. Therefore, as the number of the ONUs connected to one OLT 10 increases, the service charge per ONU is reduced. However, if a lot of ONUs are connected, optical loss occurs in the connection nodes. In addition, optical signals having a power higher than a specific level are required for detecting signals at an optical receiver. Thus, a light source having a high power is required for connecting more ONUs. If the number of the ONUs can increase even though the cost of the OLT shared by a plurality of ONUs increases, the cost reduction effect of the optical lines and the ONUs is greater than the increase in the cost of the OLT. Therefore, by increasing the power of the light source applied to the OLT, the service charge per unit ONU can be reduced. However, if the power of the light source applied to the ONU increases, the cost of the ONU increases and the service charge per ONU increases in proportion to the cost of the ONU. Increasing the output power of the ONU is economically inefficient. Accordingly, in the case of the upstream signal, there is a limitation in increasing the optical power. Furthermore, in order to compensate for optical loss occurring at the connection nodes of the ONUs, it is necessary to improve the receiver sensitivity of the optical receiver or compensate for the optical loss.

Therefore, there is an increasing demand for technologies that can reduce optical loss occurring at the optical distribution network and also flexibly cope with the increase of subscribers.

SUMMARY OF THE INVENTION

The present invention provides an OLT, which is capable of receiving more subscribers at one OLT in a TDM-PON, and a structure of an optical filter.

Embodiments of the present invention provide passive optical network systems, including: a plurality of optical signal splitter receiving optical signals from a plurality of optical network units (ONUs) to provide a plurality of upstream optical signals having different wavelengths; a hybrid optical filter multiplexing the plurality of upstream optical signals in a wavelength division multiplexing (WDM) scheme; and an optical line terminal (OLT) receiving the multiplexed upstream optical signals in a time division multiplexing (TDM) scheme.

In other embodiments of the present invention, methods for receiving upstream optical signals from a plurality of optical network units in a passive optical network system, the method including: overlapping and multiplexing a plurality of upstream optical signals having different wavelengths; and receiving, by an optical line terminal, the multiplexed upstream optical signals divided in a time division multiplexing (TDM) scheme.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF PREFERRED EMBODIMENTS

Figure 1:
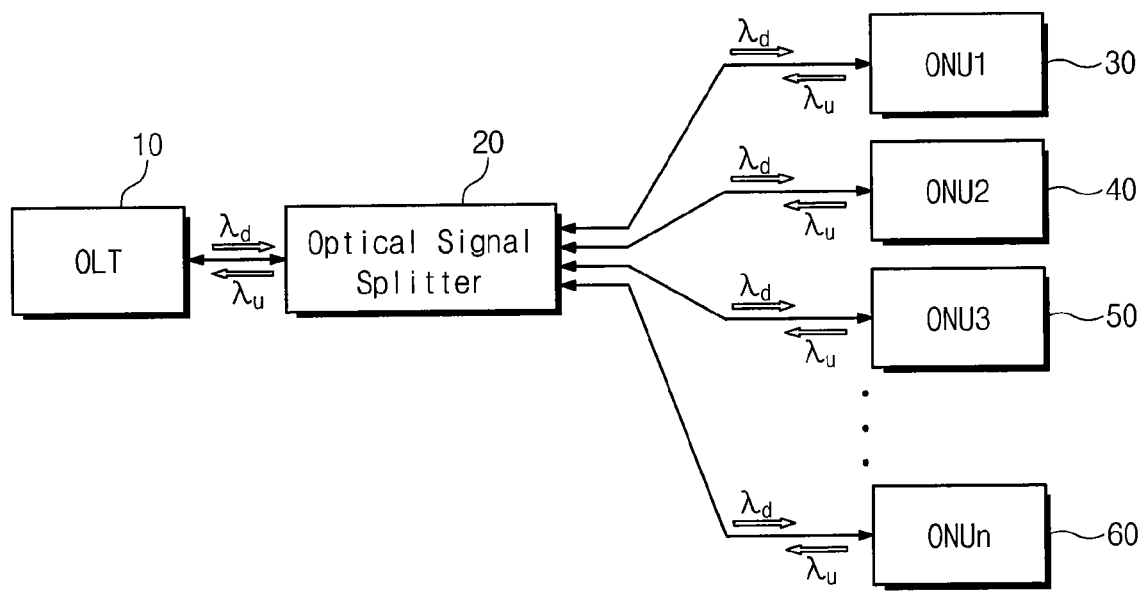
FIG. 1 is a block diagram of a TDM-PON system.

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout. Hereinafter, exemplary embodiments of the present invention will be described in detail with reference to the accompanying drawings.

Figure 2:
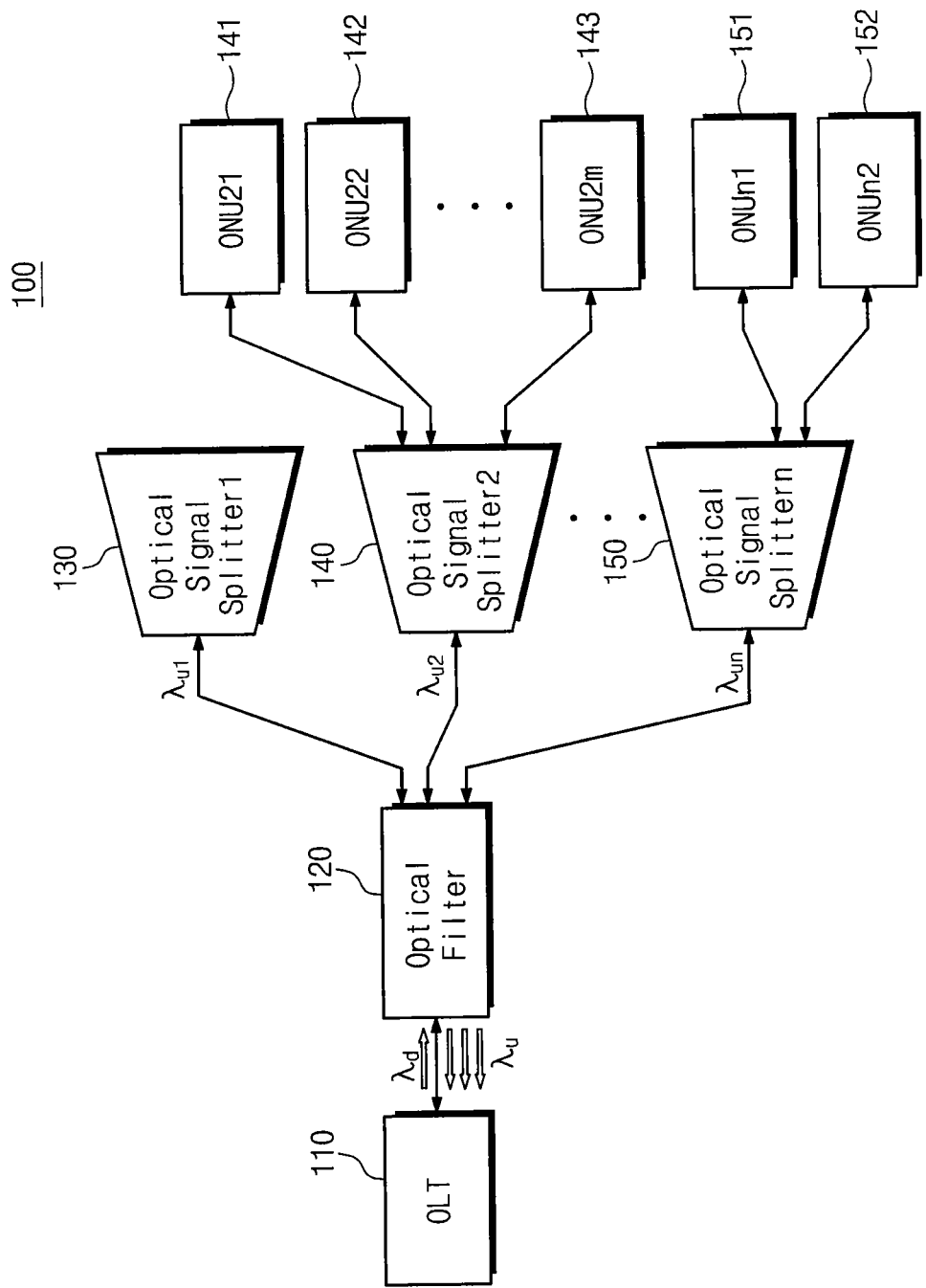
FIG. 2 is a block diagram of a PON system according to an embodiment of the present invention.

FIG. 2 is a block diagram illustrating a PON system 100 according to an embodiment of the present invention. Referring to FIG. 2, the PON system 100 according to the embodiment of the present invention includes a plurality of optical signal splitters 130, 140 and 150 connected to an OLT 110. As described above, the plurality of optical signal splitters 130, 140 and 150 are connected to a plurality of ONUs 141, 142, 143, 151 and 152. An optical filter 120 is provided for connecting the plurality of optical signal splitters 130, 140 and 159 to the OLT 110.

In the PON system 100, the OLT 110 is an element that integrates and monitors all optical signals. The OLT 110 provides service nodes, such as a broadcasting service node, a video on demand (VOD) service node and an Internet service node, to the ONUs 141, 142, 143, 151 and 152 corresponding to a plurality of service subscribers. The OLT 110 according to the embodiment of the present invention can receive upstream signals $\lambda_{u1}, \lambda_{u2}, \ldots, \lambda_{un}$ through one optical receiver or a plurality of optical receivers. The receiving method of the upstream signals $\lambda_{u1}, \lambda_{u2}, \ldots, \lambda_{un}$ in the OLT 110 will be described later with reference to FIGS. 3A, 3B and 3C.

The optical filter 120 multiplexes the upstream signals $\lambda_{u1}, \lambda_{u2}, \ldots, \lambda_{un}$ of different wavelengths, which are transmitted from the respective optical signal splitters 130, 140 and 150, and provides them to the OLT 120. The optical filter 120 splits a downstream signal $\lambda_d$, which is provided from the OLT 110, to the optical signal splitters 130, 140 and 150. According to the embodiment of the present invention, the optical filter 120 is configured with a hybrid optical filter in which mirrors and thin film type wavelength filters are formed on a single substrate, thereby minimizing optical loss. In addition, by adjusting the positions of the thin film type wavelength filters, the optical filter 120 minimizes the transmission number of the upstream signals, which are absolute to the optical loss, thereby reducing the optical loss. That is, the upstream signals transmitted to the respective input ports can be set so that they pass through the wavelength filters only one time. A detailed structure of the optical filter 120 will be described later in detail with reference to FIGS. 4 and 6.

The optical signal splitters 130, 140 and 150 function to split the optical signals between the OLT 110 and the ONUs 141, 142, 143, 151 and 152. In order for the transmission of the optical signal, the optical signal splitter 130 may use a multiplexing scheme, such as Time Division Multiplexing (TDM) or Wavelength Division Multiplexing (WDM).

The ONUs 141, 142, 143, 151 and 152 are connected to the OLT 110 in a tree structure, and the number of the ONUs to be connected to one OLT 110 is determined according to a branching rate. In order for the optical communication, the ONUs control the conversion of electric signals from the subscriber side into optical signals. The respective ONUs are connected to subscriber terminals through a VDSL modem or Ethernet interface.

The above-described PON system 100 can reduce the service charge per subscriber corresponding to the respective ONUs 141, 142, 143, 151 and 152. Furthermore, services for the ONUs 141, 142, 143, 151 and 152 expanded with the increase of the subscribers can be easily expanded through the optical filter 120 according to the embodiment of the present invention.

Figure 3A:
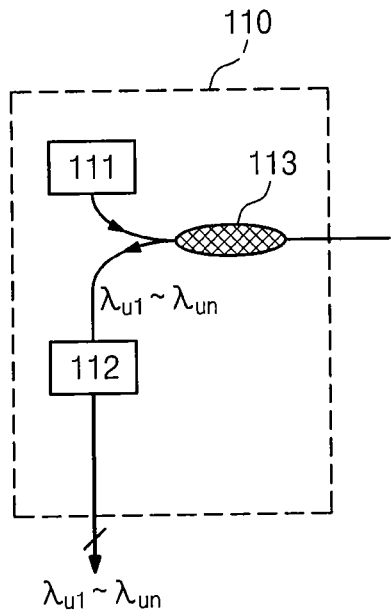
FIG. 3A is a block diagram of an OLT of FIG. 2 according to an embodiment of the present invention.
Figure 3B:
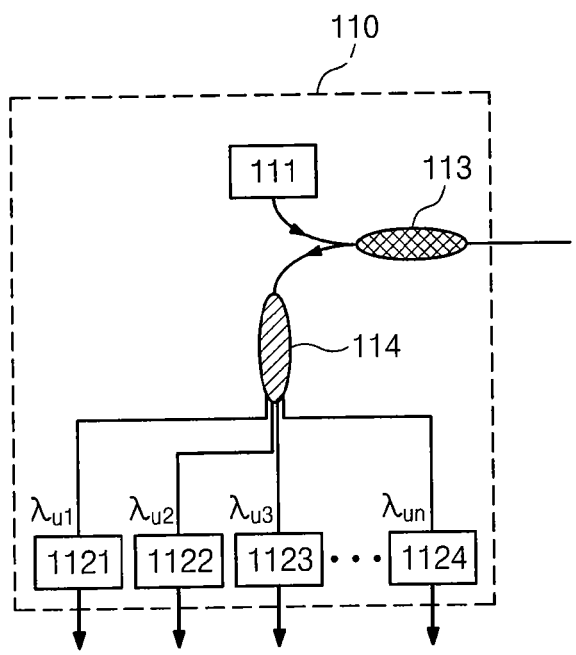
FIG. 3B is a block diagram of an OLT of FIG. 2 according to another embodiment of the present invention.
Figure 3C:
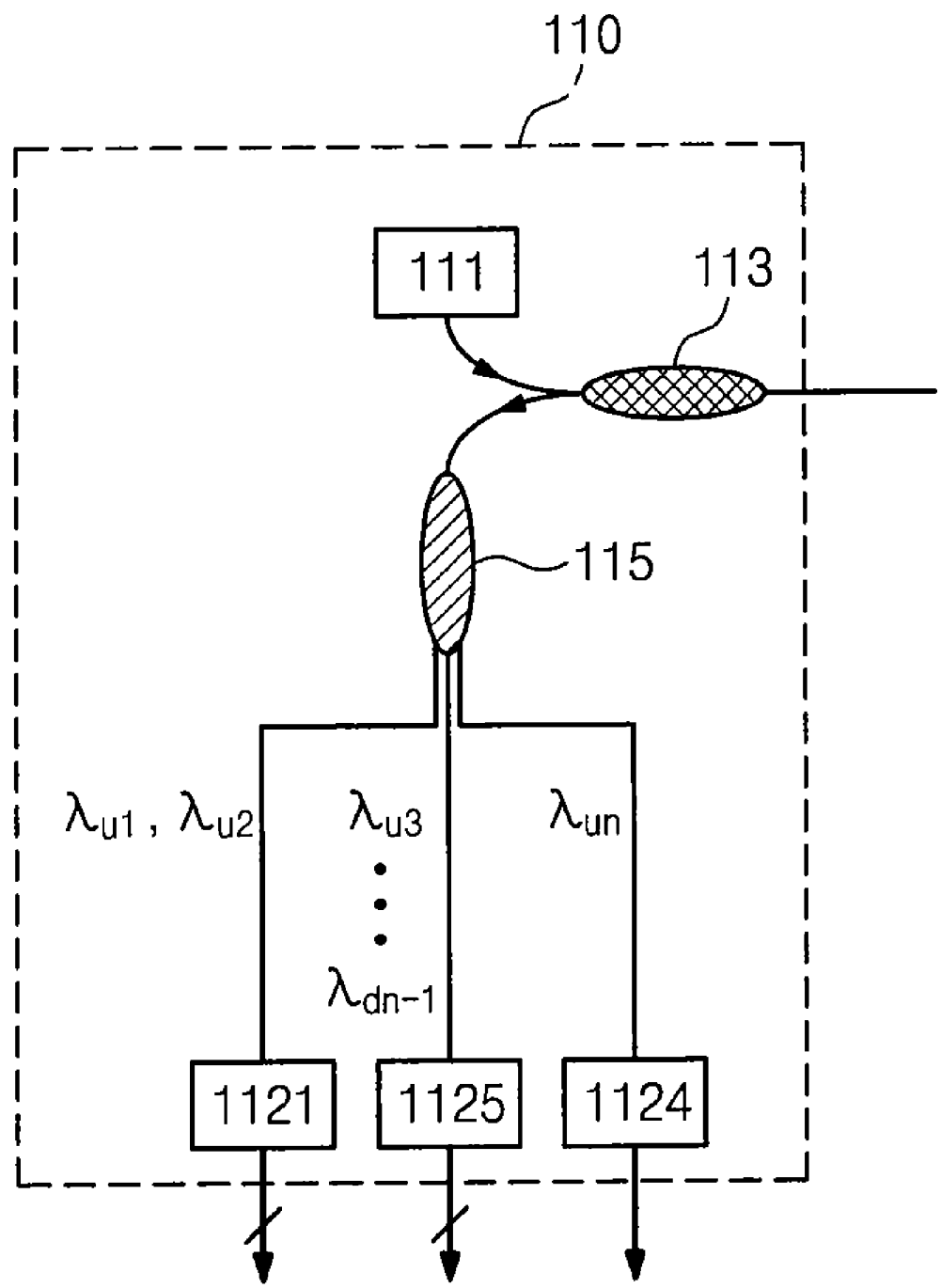
FIG. 3C is a block diagram of an OLT of FIG. 2 according to further embodiment of the present invention.

FIGS. 3A, 3B and 3C are block diagrams illustrating the OLT 110 of FIG. 2 according to exemplary embodiments of the present invention. The OLT 110 of FIG. 3A splits the upstream signals corresponding to the respective wavelengths in the TDM scheme. The OLT 110 of FIG. 3B is configured to include one optical receiver for each wavelength of the upstream signals. The OLT 110 of FIG. 3C includes hybrid optical receivers for splitting the respective signals according to the wavelengths in the TDM scheme. Further detailed description will be made below.

Referring to FIG. 3A, the OLT 110 includes a light source 111 supplying a downstream optical signal, and an optical receiver 112 receiving upstream optical signals received through an upstream/downstream signal divider 113. The upstream optical signals $\lambda_{u1}, \lambda_{u2}, \ldots, \lambda_{un}$ having different wavelengths, which are supplied from the ONUs, are input to the single optical receiver 112 through the single upstream/downstream signal divider 113. In this case, the upstream optical signals $\lambda_{u1}, \lambda_{u2}, \ldots, \lambda_{un}$ having the different wavelengths are detected by the single optical receiver 112 and time slots are allocated to all the ONUs connected to the OLT 110 in accordance with the TDM scheme. According to the OLT 110 of FIG. 3A, all the ONUs 141, 142, 143, 151 and 152 and the optical transmission line should share time and be allocated. Therefore, if the number of subscribers increases and the number of ONUs increases, the time slot that can be allocated to one ONU is reduced. However, the above-described OLT 110 can be manufactured with a relatively simple structure and can simplify the signal processing of the receiver.

Referring to FIG. 3B, the OLT 110 according to another embodiment of the present invention includes a light source 110 supplying a downstream optical signal to ONUs, and a wavelength divider 114 dividing upstream optical signals received through an upstream/downstream signal divider 113 into optical signals according to wavelengths. The wavelength divider 114 divides all the upstream optical signals $\lambda_{u1}, \lambda_{u2}, \ldots, \lambda_{un}$ having different wavelengths according to the respective wavelengths. In order to receive the respective upstream optical signals divided according to the respective wavelengths, the OLT 110 includes a plurality of optical receivers 1121, 1122, …, 1124. The upstream optical signals received through the optical receivers 1121, 1122, …, 1124 will be supplied to necessary elements. The upstream optical signals $\lambda_{u1}, \lambda_{u2}, \ldots, \lambda_{un}$ having the different wavelengths are divided according to the wavelengths, and the respective optical receivers receive the divided upstream optical signals having the same wavelengths. Therefore, the upstream signals are combined in a TDM scheme that allocates time slot to the ONUs having the same wavelength. To this end, the OLT 110 must include the plurality of optical receivers 1121, 1122, … 1124, and the wavelength divider 114. Thus, compared with the OLT 110 of FIG. 3A, the structure of the OLT of FIG. 3B is more complicated. However, the OLT 110 of FIG. 3B can provide a high-speed data rate because the respective upstream signals are used without regard to the allocation of the time slot.

FIG. 3C schematically illustrates the structure of the OLT 110 having the advantages of the OLTs of FIGS. 3A and 3B. Referring to FIG. 3C, the OLT 110 includes a light source 111 supplying a downstream optical signal to ONUs, and a wavelength divider 115 dividing upstream optical signals received through an upstream/downstream signal divider 113 into optical signals according to wavelengths. The wavelength divider 115 may divide the upstream optical signals $\lambda_{u1}, \lambda_{u2}, \ldots, \lambda_{un}$ into a plurality of groups according to the wavelengths. In this case, the wavelength divider 115 divides the upstream optical signals $\lambda_{u1}$ and $\lambda_{u2}$ into one group, and the upstream optical signals $\lambda_{u3}, \ldots, \lambda_{un-1}$ into another group. The upstream optical signal $\lambda_{un}$ corresponding to one wavelength is divided into one group. The upstream optical signals corresponding to the divided groups are received by the optical receivers 1121, 1124 and 1125. The upstream optical signals having the wavelengths of $\lambda_{u1}$ and $\lambda_{u2}$ are input to the optical receiver 1121, and the upstream optical signals having the wavelengths of $\lambda_{u3}, \ldots, \lambda_{un-1}$ are input to the optical receiver 1125. Therefore, the upstream optical signals are combined in a TDM scheme that allocates time slot to the ONUs having the wavelengths of $\lambda_{u1}$ and $\lambda_{u2}$ or the wavelengths of $\lambda_{u3}, \ldots, \lambda_{un-1}$. Consequently, the OLT 110 of FIG. 3C uses both the TDM scheme and the WDM scheme, thereby providing the reduced complexity and the improved data rate.

Figure 4:
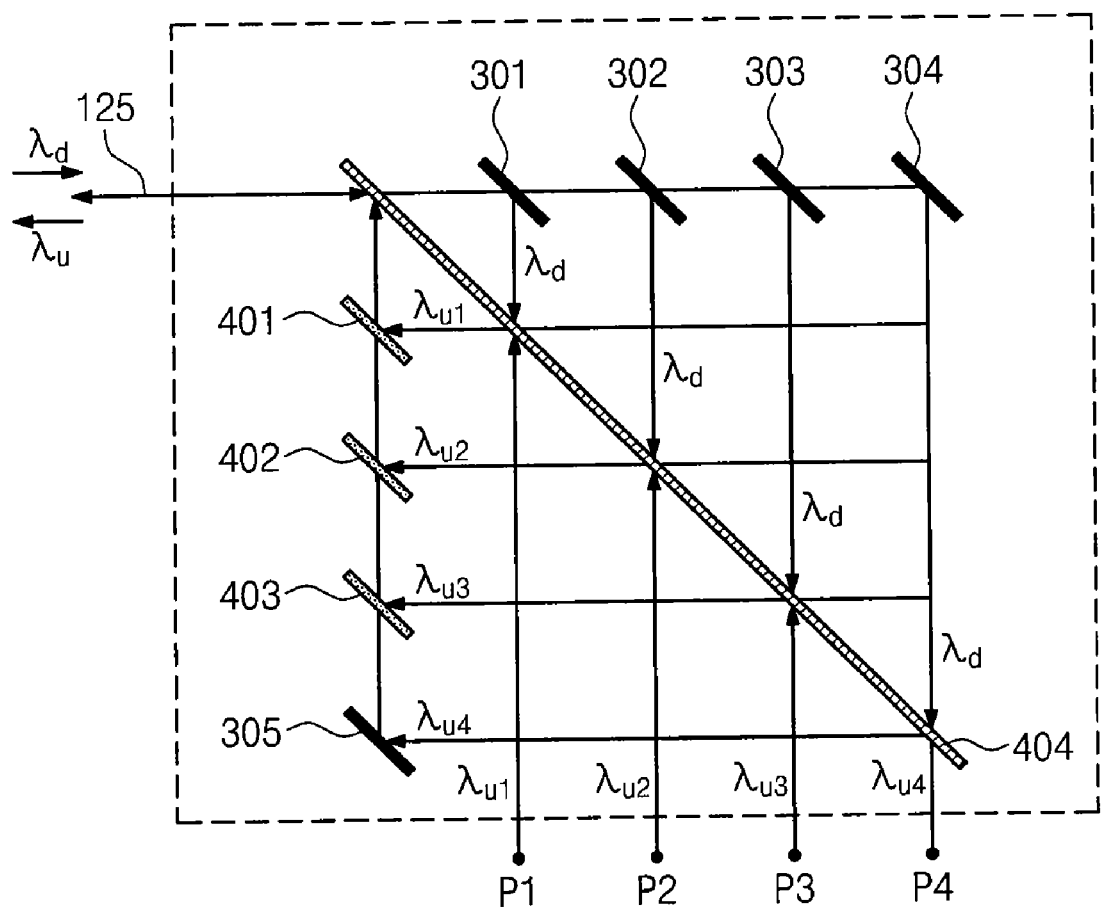
FIG. 4 illustrates an optical filter of FIG. 2 according to an embodiment of the present invention.

FIG. 4 illustrates a detailed structure of the optical filter of FIG. 2. Referring to FIG. 4, the optical filter 120 according to the embodiment of the present invention is configured with a hybrid optical filter that overlaps and multiplexes the upstream optical signals $\lambda_{u1}, \lambda_{u2}, \lambda_{u3}$ and $\lambda_{u4}$ and splits the downstream optical signal $\lambda_d$ to the respective input ports. Specifically, the optical filter 120 includes optical signal dividers 301, 302 and 303, mirrors 304 and 305, and wavelength filters 401, 402, 403 and 404. The case of four input ports for the upstream signals will be described below. That is, the upstream optical signals $\lambda_{u1}, \lambda_{u2}, \lambda_{u3}$ and $\lambda_{u4}$ having different wavelengths are input to the optical filter 120 through four input ports P1, P2, P3 and P4.

The optical signal dividers 301, 302 and 303 and the mirror 304 receive the downstream optical signal $\lambda_d$ transferred from the OLT 110 and split it to the respective input ports. The optical signal divider 301 reflects a part of the downstream optical signal $\lambda_d$ to the first input port P1, and transfers a partially transmitted signal to the optical signal divider 302. The optical signal divider 302 reflects a part of the downstream optical signal $\lambda_d$, which is transmitted from the optical signal divider 301, to the second input port P2, and transfers a transmitted downstream optical signal to the optical signal divider 303. The optical signal divider 303 reflects a part of the downstream optical signal $\lambda_d$, which is transmitted from the optical signal divider 302, to the third input port P3, and transfers a partially transmitted optical signal to the mirror 304. The mirror 304 reflects the downstream optical signal $\lambda_d$, which is transmitted from the optical signal divider 303, to the fourth input port P4. The optical signal dividers 301, 302 and 303 and the mirror 304 may be manufactured using thin film mirrors. The optical signal dividers 301, 302 and 303 and the mirror 304 function as optical signal splitters that split the downstream signal to the respective input ports.

The wavelength filters 401, 402, 403 and 404 and the mirror 305 are configured to multiplex the upstream optical signals $\lambda_{u1}, \lambda_{u2}, \lambda_{u3}$ and $\lambda_{u4}$ provided to the input ports of the optical filter 120. That is, the wavelength filters 401, 402, 403 and 404 and the mirror 305 are configured to multiplex the upstream optical signals $\lambda_{u1}, \lambda_{u2}, \lambda_{u3}$ and $\lambda_{u4}$ input through different optical paths, and provide the multiplexed upstream signals to the OLT 110. First, the upstream optical signals input to the respective input ports are totally reflected by the wavelength filter 404. The wavelength filter 404 has a reflectivity to totally reflect light corresponding to the wavelength ranges of the upstream optical signals $\lambda_{u1}, \lambda_{u2}, \lambda_{u3}$ and $\lambda_{u4}$, and transmits light corresponding to the wavelength range of the downstream optical signal $\lambda_d$.

The upstream optical signal $\lambda_{u4}$ input to the fourth input port P4 is reflected by the wavelength filter 404 and reflected by the mirror 305. The upstream optical signal $\lambda_{u4}$ is transmitted sequentially through the wavelength filters 403, 402 and 401 and is again reflected to the OLT 110 by the wavelength filter 404. The upstream optical signal $\lambda_{u3}$ input through the third input port P3 is totally reflected sequentially through the wavelength filters 402 and 401. Thereafter, the upstream optical signal $\lambda_{u3}$ is transmitted sequentially through the wavelength filters 402 and 401 and is again reflected to the OLT 110 by the wavelength filter 404. The upstream optical signal $\lambda_{u2}$ input through the second input port P2 is totally reflected sequentially through the wavelength filters 404 and 402. Thereafter, the upstream optical signal $\lambda_{u2}$ is transmitted through the wavelength filter 401 and is again reflected to the OLT 110 by the wavelength filter 404. The upstream optical signal $\lambda_{u1}$ input through the first input port P1 is totally reflected sequentially through the wavelength filters 404 and 401. Thereafter, the upstream optical signal $\lambda_{u1}$ is again reflected to the OLT 110 by the wavelength filter 404.

In order to implement the above-described multiplexing of the upstream optical signals $\lambda_{u1}$, $\lambda_{u2}$, $\lambda_{u3}$ and $\lambda_{u4}$, the wavelength filter 401 should be manufactured to have a filtering characteristic to totally reflect the wavelength of the upstream optical signal $\lambda_{u1}$ and transmit the wavelengths of the upstream optical signals $\lambda_{u2}$, $\lambda_{u3}$ and $\lambda_{u4}$. The wavelength filter 402 should be manufactured to totally reflect the wavelength of the upstream optical signal $\lambda_{u2}$ and transmit the wavelengths of the upstream optical signals $\lambda_{u3}$ and $\lambda_{u4}$. The wavelength filter 403 should be manufactured to totally reflect the wavelength of the upstream optical signal $\lambda_{u3}$ and transmit the wavelength of the upstream optical signal $\lambda_{u4}$. As described above, the wavelength filter 404 should have the total reflection characteristic with respect to the wavelengths of the upstream optical signals $\lambda_{u1}$, $\lambda_{u2}$, $\lambda_{u3}$ and $\lambda_{u4}$ and have the transmission characteristic with respect to the wavelength of the downstream optical signal $\lambda_d$.

The optical filter 120 described above with reference to FIG. 4 can enables the PON 100 to efficiently use the output strengths of the upstream and downstream optical signals between the OLT 110 and the optical signal splitters 130, 140 and 150. However, in the typical wavelength filter, the optical loss upon the transmission of the optical signals is about two times greater than the optical loss upon the reflection of the optical signals. Therefore, the arrangement of the wavelength filters and the mirror in the optical filter 120 can be designed to minimize number of the transmission of the optical signals. The arrangement of the wavelength filters and the mirror in order to minimize the number of the transmission of the optical signals will be described later in detail with reference to FIGS. 5 and 6.

Figure 5:
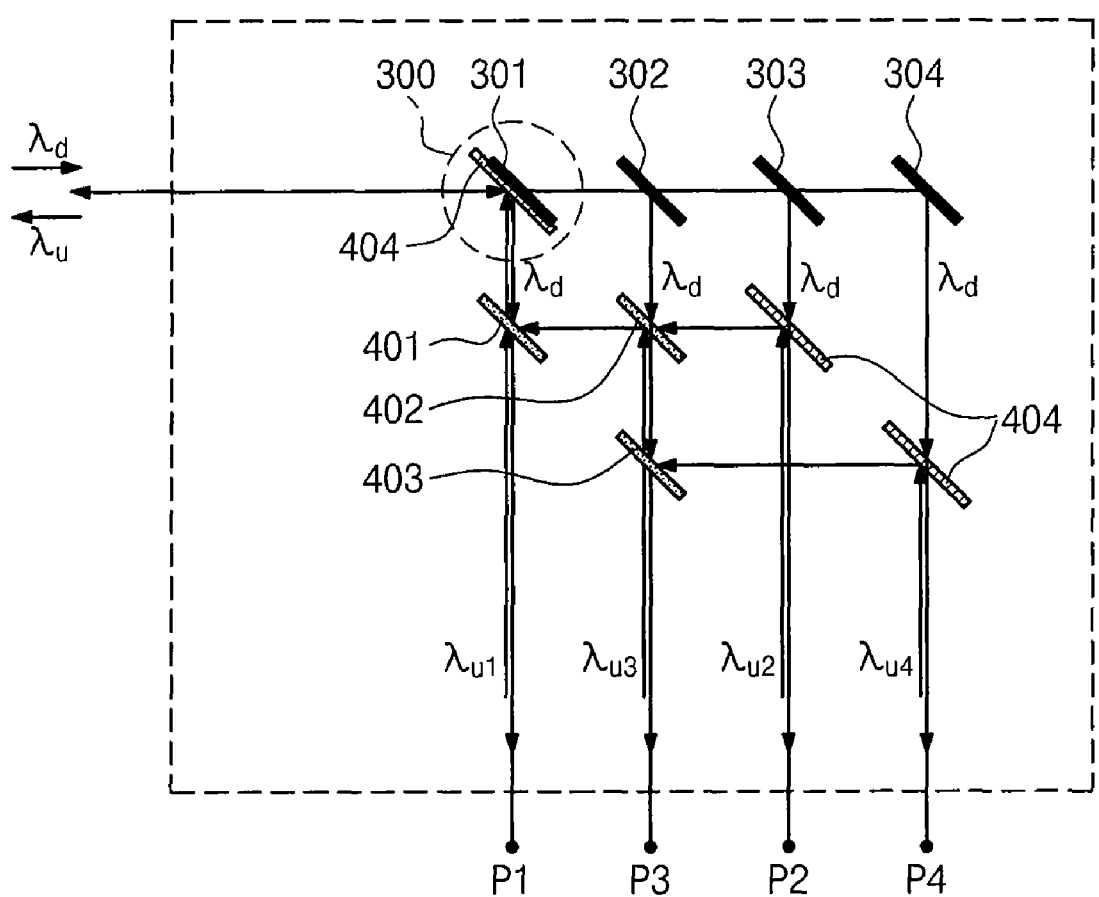
FIG. 5 illustrate an optical filter of FIG. 2 according to another embodiment of the present invention.

FIG. 5 illustrates the hybrid optical filter 120 according to another embodiment of the present invention. Referring to FIG. 5, the optical filter 120 according to another embodiment of the present invention can reduce optical loss by minimizing the transmission number of the optical signals (especially, the upstream optical signals). In particular, in this embodiment, a device 300 may be formed on a single glass substrate by a coating such as a dielectric multi-layer so that the device 300 has both the mirror characteristic and the wavelength division characteristic. Further detailed description will be made below.

The optical signal dividers 301, 302 and 303 reflect a part of the downstream optical signal $\lambda_d$ and transmits the rest of the downstream optical signal $\lambda_d$, and the mirror 304 has a total reflection characteristic with respect to the downstream optical signal $\lambda_d$. The wavelength filters 401, 402, 403 and 404 have a transmission characteristic with respect to the downstream optical signal $\lambda_d$. Therefore, the downstream optical signal $\lambda_d$ input from the OLT 110 and transmitted through the wavelength filter 404 are split into the respective input ports P1, P2, P3 and P4 by the optical signal dividers 301, 302 and 303 and the mirror 304.

The wavelength filters 401, 402, 403 and 404 for multiplexing the upstream optical signals $\lambda_{u1}$, $\lambda_{u2}$, $\lambda_{u3}$ and $\lambda_{u4}$ provided to the input ports are arranged to have the minimum number of transmission with respect to the respective upstream optical signals $\lambda_{u1}$, $\lambda_{u2}$, $\lambda_{u3}$ and $\lambda_{u4}$. In particular, such a function may be provided through the wavelength filter 404 formed on the same substrate together with the optical signal divider 301. The upstream optical signal $\lambda_{u4}$ input to the fourth input port P4 is reflected by the wavelength filters 404, 403, 402 and 401 in sequence, reflected by the wavelength filter 404, and transferred to the OLT 110. The upstream optical signal $\lambda_{u3}$ input to the third input port P3 is reflected by the wavelength filter 404, passes through the wavelength filter 403, and reflected by the wavelength filter 401. The upstream optical signal $\lambda_{u3}$ is reflected by the wavelength filter 404 and transferred to the OLT 110. The upstream optical signal $\lambda_{u2}$ input to the second input port P2 passes through the wavelength filter 403 and is reflected by the wavelength filter 402. The upstream optical signal $\lambda_{u2}$ is again reflected by the wavelength filters 401 and 404 in sequence, and transferred to the OLT 110. The upstream optical signal $\lambda_1$ input to the first input port P1 passes through the wavelength filter 401, reflected by the wavelength filter 404, and transferred to the OLT 110.

In order for the reflection and transmission characteristics with respect to the above-described upstream optical signals $\lambda_{u1}$, $\lambda_{u2}$, $\lambda_{u3}$ and $\lambda_{u4}$, the wavelength filter 401 has the transmission characteristic with respect to only the upstream optical signal $\lambda_{u1}$ and has the reflection characteristic with respect to the upstream optical signals $\lambda_{u2}$, $\lambda_{u3}$ and $\lambda_{u4}$ The wavelength filter 402 has the transmission characteristic with respect to only the upstream optical signal $\lambda_{u2}$ and has the reflection characteristic with respect to the upstream optical signals $\lambda_{u3}$ and $\lambda_{u4}$. The wavelength filter 403 has the transmission characteristic with respect to only the upstream optical signal $\lambda_{u3}$ and has the reflection characteristic with respect to the upstream optical signal $\lambda_{u4}$. The wavelength filter 404 should be manufactured to have the reflection characteristic with respect to the upstream optical signals $\lambda_{u1}$, $\lambda_{u2}$, $\lambda_{u3}$ and $\lambda_{u4}$.

As a result, according to the optical filter 120 of FIG. 5, the respective upstream optical signals $\lambda_{u1}$, $\lambda_{u2}$ and $\lambda_{u3}$ pass through the wavelength filters only one time. The upstream optical signal $\lambda_{u4}$ will be transferred to the OLT 110 through only the reflection paths with respect to the wavelength filters, without the transmission paths. Hence, the optical loss occurring at the upstream optical signals $\lambda_{u1}$, $\lambda_{u2}$, $\lambda_{u3}$ and $\lambda_{u4}$ can be remarkably reduced.

Figure 6:
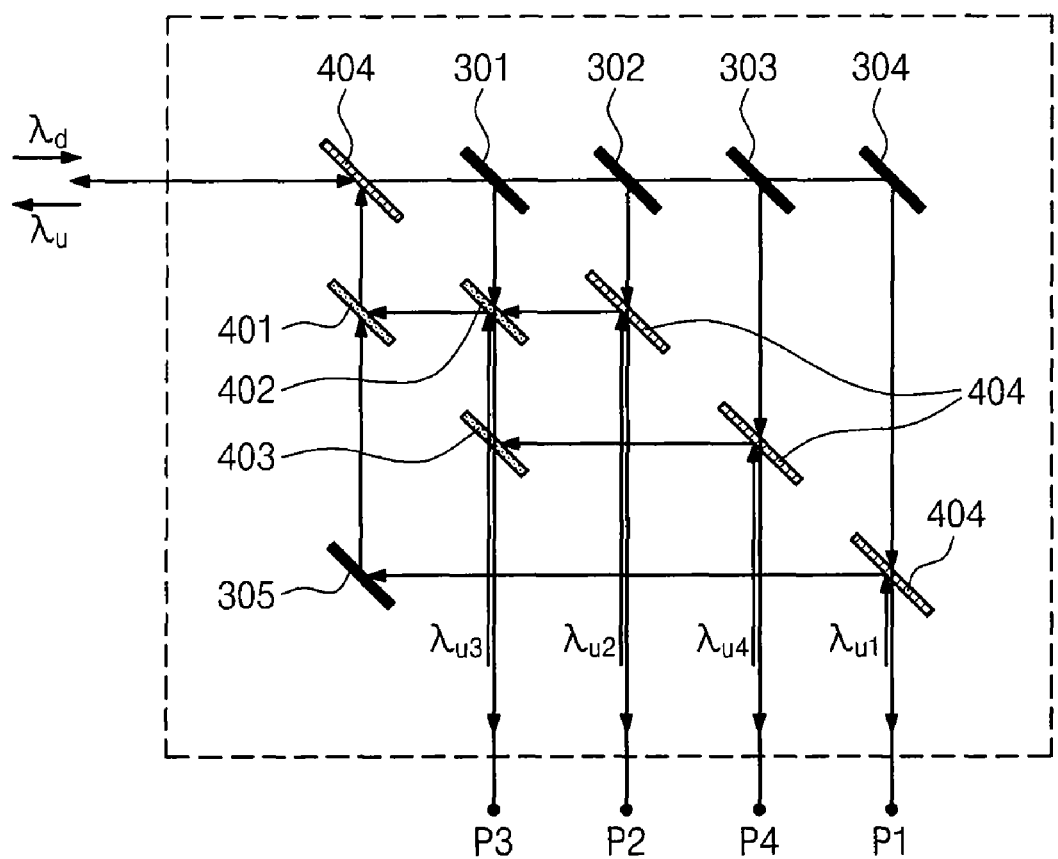
FIG. 6 illustrates an optical filter of FIG. 2 according to further embodiment of the present invention.

FIG. 6 illustrates the hybrid optical filter 120 according to further embodiment of the present invention. Referring to FIG. 6, the optical filter 120 according to the further embodiment of the present invention can reduce the optical loss by minimizing the number of the transmission of the optical signals (especially, the upstream optical signals). The embodiment of FIG. 6 can provide the function of multiplexing and dividing the optical signals just like the embodiment of FIG. 5, without the structure of FIG. 5 configured to simultaneously obtain the mirror characteristic and the wavelength division characteristic.

The optical signal dividers 301, 302 and 303 reflect a part of the downstream optical signal $\lambda_d$, and transmit the rest of the downstream optical signal $\lambda_d$. The mirror 304 has the total reflection characteristic with respect to the downstream optical signal $\lambda_d$, and the mirror 305 has the total reflection characteristic with respect to the upstream optical signal $\lambda_{u4}$.

The wavelength filters 401, 402, 403 and 404 have the transmission characteristics with respect to the downstream optical signal $\lambda_d$. Therefore, the downstream optical signal $\lambda_d$, which is transferred from the OLT 110 and passes through the wavelength filter 404, is split into the input ports P1, P2, P3 and P4 by the optical signal dividers 301, 302 and 303 and the mirror 304.

The wavelength filters 401, 402, 403 and 404 for multiplexing the upstream optical signals $\lambda_{u1}$, $\lambda_{u2}$, $\lambda_{u3}$ and $\lambda_{u4}$ provided to the input ports are arranged to have the minimum number of transmission with respect to the respective upstream optical signals $\lambda_{u1}$, $\lambda_{u2}$, $\lambda_{u3}$ and $\lambda_{u4}$. The wavelength filter 401 has the transmission characteristic with respect to the upstream optical signal $\lambda_{u1}$ and has the reflection characteristic with respect to the upstream optical signals $\lambda_{u2}$, $\lambda_{u3}$ and $\lambda_{u4}$. The wavelength filter 402 has the transmission characteristic with respect to only the upstream optical signal $\lambda_{u2}$ and has the reflection characteristic with respect to the upstream optical signals $\lambda_{u3}$ and $\lambda_{u4}$. The wavelength filter 403 has the transmission characteristic with respect to only the upstream optical signal $\lambda_{u3}$ and the reflection characteristic with respect to the upstream optical signal $\lambda_{u4}$.

According to the arrangement of FIG. 6, the respective upstream optical signals $\lambda_{u1}$, $\lambda_{u2}$ and $\lambda_{u3}$ pass through the wavelength filters only one time. The upstream optical signal $\lambda_{u3}$ will be transferred to the OLT 110 through only the reflection paths with respect to the wavelength filters, without the transmission paths. Hence, the optical loss occurring at the upstream optical signals $\lambda_{u1}$, $\lambda_{u2}$, $\lambda_{u3}$ and $\lambda_{u4}$ can be remarkably reduced.

According to the above-described PON system, the optical loss occurring at the upstream optical signals and the downstream optical signal can be minimized, and the service system can be easily expanded without great increase of cost when the number of subscribers increase.

According to the PON system and the optical signal receiving method thereof, the network expansion can be easily achieved when the number of subscribers increases, and the optical loss can be minimized.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A passive optical network system, comprising:
   a plurality of optical signal splitter receiving optical signals from a plurality of optical network units (ONUs) to provide a plurality of upstream optical signals having different wavelengths;
   a hybrid optical filter multiplexing the plurality of upstream optical signals in a wavelength division multiplexing (WDM) scheme; and
   an optical line terminal (OLT) receiving the multiplexed upstream optical signals in a time division multiplexing (TDM) scheme,
   wherein the optical line terminal comprises a wavelength divider dividing the multiplexed upstream optical signals into a plurality of groups according to the wavelengths, and a plurality of optical receivers receiving the divided groups from the wavelength divider, and
   wherein at least one of the optical receivers combines a plurality of optical network units corresponding to a plurality of wavelengths included in any one of the groups input among the plurality of optical network units in the time division multiplexing (TDM) scheme.

2. The passive optical network system of claim 1, wherein the hybrid optical filter comprises:
   a main filter reflecting the plurality of upstream optical signals to different positions and transmitting a downstream optical signal; and
   a multiplexing unit overlapping the plurality of upstream optical signals, reflected from the main filter, to one position and transferring the overlapped upstream optical signals to the optical line terminal.

3. The passive optical network system of claim 2, wherein the multiplexing unit comprises:
   a mirror reflecting one of the upstream optical signals reflected from the main filter; and
   a plurality of filters transmitting the upstream optical signals reflected from the mirror and selectively transmitting or reflecting the reflected upstream optical signals.

4. The passive optical network system of claim 1, wherein the hybrid optical filter comprises:
   a plurality of optical signal dividers and a mirror dividing a downstream optical signal to different input ports; and
   a plurality of wavelength filters overlapping the plurality of upstream optical signals to one position through a plurality of filters, the plurality of wavelength filters being arranged to have minimum number of transmission with respect to the plurality of upstream optical signals.

5. The passive optical network system of claim 4, wherein any one of the optical signal dividers adjacent to output ports of the overlapped upstream optical signals, and any one of the wavelength filters are formed on same substrate.

6. The passive optical network system of claim 4, wherein any one of the optical signal dividers adjacent to output ports of the overlapped upstream optical signals, and any one of the wavelength filters are formed on a different substrate.

7. The passive optical network system of claim 4, wherein the plurality of wavelength filters are arranged to transmit the plurality of upstream optical signals only one time.

8. A method for receiving upstream optical signals from a plurality of optical network units in a passive optical network system, the method comprising:
   overlapping and multiplexing a plurality of upstream optical signals having different wavelengths; and
   receiving, by an optical line terminal, the multiplexed upstream optical signals divided in a time division multiplexing (TDM) scheme,
   wherein the multiplexed upstream optical signals are divided according to the different wavelengths, and the upstream optical signals corresponding to the divided wavelengths are received through a plurality of optical receivers, and
   wherein the upstream optical signals of the same wavelengths received by any one of the optical receivers are divided in a time division multiplexing (TDM) scheme.

9. The method of claim 8, wherein the multiplexed upstream optical signals are divided into a plurality of groups according to the wavelengths and received through the plurality of optical receivers according to the divided groups.

10. A passive optical network system, comprising:
    a plurality of optical signal splitter receiving optical signals from a plurality of optical network units (ONUs) to provide a plurality of upstream optical signals having different wavelengths;
    a hybrid optical filter multiplexing the plurality of upstream optical signals in a wavelength division multiplexing (WDM) scheme; and an optical line terminal (OLT) receiving the multiplexed upstream optical signals in a time division multiplexing (TDM) scheme, wherein the hybrid optical filter comprises:

a plurality of optical signal dividers and a mirror dividing a downstream optical signal to different input ports, and a plurality of wavelength filters overlapping the plurality of upstream optical signals to one position through a plurality of filters, the plurality of wavelength filters being arranged to have minimum number of transmission with respect to the plurality of upstream optical signals.

11. The passive optical network system of claim 10, wherein the optical line terminal receives the multiplexed upstream optical signals through one optical receiver and splits the received multiplexed upstream optical signals into the plurality of upstream optical signals in the time division multiplexing (TDM) scheme.

12. The passive optical network system of claim 10, wherein the optical line terminal comprises:

a wavelength divider dividing the multiplexed upstream optical signals according to the different wavelengths; and a plurality of optical receivers receiving the divided upstream optical signals having the different wavelengths from the wavelength divider.

13. The passive optical network system of claim 12, wherein the optical line terminal combines optical network units corresponding to the same wavelengths among the plurality of the optical network units.

14. The passive optical network system of claim 10, wherein any one of the optical signal dividers adjacent to output ports of the overlapped upstream optical signals, and any one of the wavelength filters are formed on same substrate.

15. The passive optical network system of claim 10, wherein any one of the optical signal dividers adjacent to output ports of the overlapped upstream optical signals, and any one of the wavelength filters are formed on a different substrate.

16. The passive optical network system of claim 10, wherein the plurality of wavelength filters are arranged to transmit the plurality of upstream optical signals only one time.

* * * * *